(No Model.) 5 Sheets—Sheet 1.

C. B. FAIRCHILD.
VEHICLE BRAKE.

No. 567,951. Patented Sept. 15, 1896.

Witnesses
Wm. F. Hanning
Wm. M. Rheem

Inventor
Charles B. Fairchild,
by Geo. E. Waldo
Atty.

THE NORRIS PETERS CO., PHOTO-LITHO., WASHINGTON, D. C.

(No Model.) 5 Sheets—Sheet 2.
C. B. FAIRCHILD.
VEHICLE BRAKE.

No. 567,951. Patented Sept. 15, 1896.

Fig. 4.

Witnesses
Wm. F. Henning
Wm. M. Rheem

Inventor
Charles B. Fairchild,
by Geo. E. Waldo.
Atty.

(No Model.) 5 Sheets—Sheet 4.

C. B. FAIRCHILD.
VEHICLE BRAKE.

No. 567,951. Patented Sept. 15, 1896.

(No Model.)   5 Sheets—Sheet 5.

C. B. FAIRCHILD.
VEHICLE BRAKE.

No. 567,951.   Patented Sept. 15, 1896.

Witnesses
Wm. F. Henning
Bm. M. Rheem

Inventor
Charles B. Fairchild,
by Geo. E. Waldo,
Atty.

UNITED STATES PATENT OFFICE.

CHARLES B. FAIRCHILD, OF NEW YORK, N. Y., ASSIGNOR OF ONE-EIGHTH TO DANIEL W. BOSLEY, OF CHICAGO, ILLINOIS.

VEHICLE-BRAKE.

SPECIFICATION forming part of Letters Patent No. 567,951, dated September 15, 1896.

Application filed December 3, 1895. Serial No. 570,948. (No model.)

*To all whom it may concern:*

Be it known that I, CHARLES B. FAIRCHILD, a citizen of the United States, and a resident of New York, in the county of New York and State of New York, have invented a new and useful Vehicle-Brake, of which the following is a specification.

This invention relates to improvements in vehicle-brakes, and relates particularly to improvements in what may appropriately be designated as "track-brakes," comprising a brush supported beneath the vehicle and adapted to be depressed or lowered into contact with the road-bed over which the vehicle is passing and raised or elevated out of contact with said road-bed at the will of the operator.

The object of the present invention is to provide an improved brake of this type. In the preferable form thereof now known to me a brake embodying my invention, broadly stated, comprises a brush supported beneath the body of the car or vehicle and movable toward and from the road-bed over which said car or vehicle is passing, said brush consisting of a rigid plate or back in which are secured a plurality of resilient teeth, which project from the under side thereof, and means to actuate said brush toward and from said road-bed.

The invention also consists in the various other features, combinations of features, and details of construction hereinafter described, and then pointed out in the claims.

In the accompanying drawings a brake embodying my invention is fully illustrated.

Fig. 12 shows a brush having rigid teeth.

The essential feature of my improved brake consists of a brake-brush supported upon the car in such manner that it may be depressed to bring the free ends of said brush-teeth into contact with the road-bed, preferably between the treads of the car-wheels.

A brake-brush embodying my invention (herein designated, as a whole, by A) consists of a rigid back $A'$, preferably made of hard wood, in one side of which are secured a desired number of brush-teeth $a$, made of spring-steel or other suitable material, which are driven into holes formed in said brush-back $A'$ for their reception.

In the preferable construction shown a metallic plate $a'$ is rigidly secured to the face or side of the rigid brush-back $A'$, said plate $a'$ being perforated in proper manner to permit said brush-teeth $a$ to be inserted through it into the rigid back $A'$.

Figures 8, 13, 14, 15:
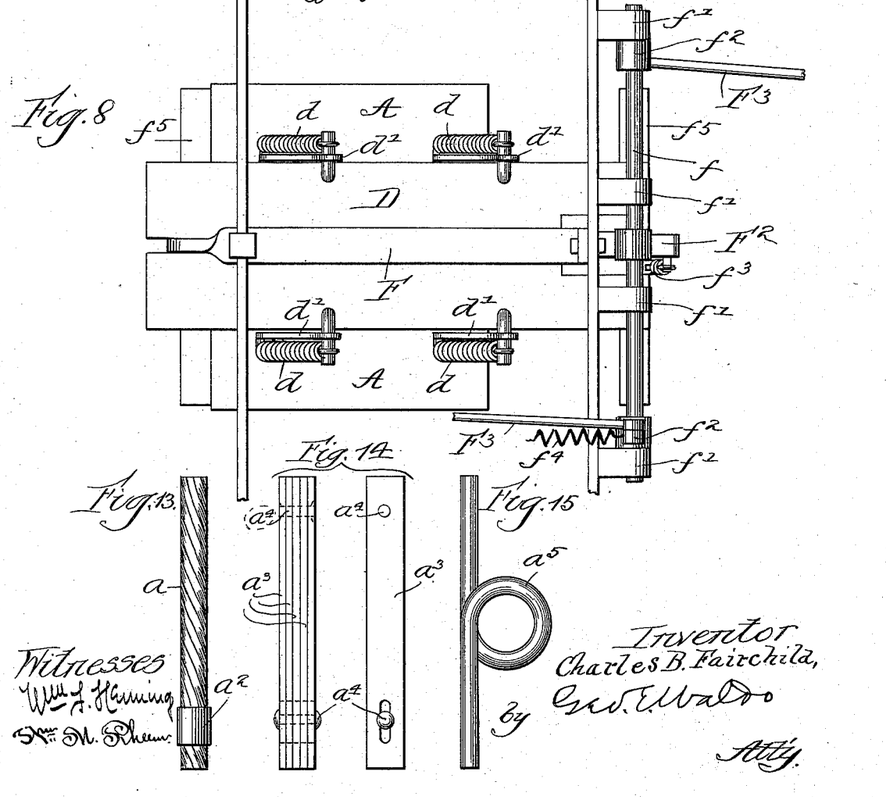
Fig. 8 is a top plan view thereof.
Figs. 13, 14, and 15 show different forms of resilient teeth.

In Figs. 13, 14, and 15 of the drawings I have illustrated three different forms of brush-teeth which I will now describe in detail.

What I now consider the preferable form of brush-tooth is that shown in Fig. 13 of the drawings. This form of brush-tooth is made from a strand of wire cable cut off to the proper length and tempered a mild spring-temper. To prevent untwisting or fraying of brush-teeth of this kind, collars or ferrules $a^2$ are secured thereto at a short distance from their free ends, as clearly shown. Brush-teeth constructed from cable-strands in this manner admit of limited longitudinal compression, which is an advantageous feature that will be referred to hereinafter.

A further and very important advantage in the use of brush-teeth of this kind is their cheapness, due to the fact that they may be made from the strands of ordinary cable used to propel the cars on cable-railroads. In splicing such cables, to repair breaks and the like, many scraps of cable-strands are formed which may be utilized to make brush-teeth and which would otherwise be practically useless and worthless. A great economy is thus effected, as the stock for the brush-teeth can be procured in abundance at a very small expense. Brush-teeth of this kind are substantially circular in cross-section and about seven-sixteenths of an inch in diameter.

A second form of brush-tooth (illustrated in Fig. 14 of the drawings) consists of a plurality of strips or plates $a^3$ of sheet-steel drawn to a spring-temper and secured together by a rivet or rivets $a^4$, so as to form a laminated structure. Preferably the layers $a^3$, forming said brush-tooth, will be secured together only at the end that is inserted in the back A', leaving the outer free ends thereof disconnected from each other. If for any reason deemed desirable, however, my invention contemplates securing said spring-plates $a^3$ together at both ends; but in case this construction is used the rivet which secures the outer free ends of said plates together is inserted through registering slots formed therein. In this manner the ends of said plates will always remain even under flexure, as they would were they disconnected. Teeth of this type will be square or rectangular in cross-section, and a desirable size therefor is about three-quarters of an inch to one inch square.

The third form of brush-tooth (shown in Fig. 15 of the drawings) consists of a solid steel rod or wire, which is likewise drawn to a mild spring-temper, in which is formed a coil or loop $a^5$, whereby the flexibility of teeth of this type is very greatly increased. When brush-teeth of this form are used, they are secured in the back A' in such position that the loops $a^5$ will extend in the direction in which said teeth will be flexed by the application of the brake to stop the car. Brush-teeth of this form will preferably be circular in cross-section and about one-half of an inch in diameter.

The size and dimensions of my improved brake-brush will vary according to circumstances and conditions, the principal limitation being the space available in which to mount and operate the same. When conditions will permit, a preferable size and form of brush is about thirty inches, transversely of the road-bed, by about nine inches lengthwise of said road-bed. The foregoing dimensions refer to the area occupied by the brush-teeth only, as it will be necessary to make the back A' of said brush considerably longer than nine inches, in order to give desired stability to said brush.

The brush-teeth $a$ are secured in the brush-back A' at a distance of about one-half an inch apart, transversely of said brush-back, and about three inches apart lengthwise thereof.

The brush-teeth $a$ project from the brush-back A' from about three inches when brush-teeth made of cable-strands are used to about four and one-half inches when laminated teeth, such as illustrated in Fig. 14, are used. Preferably also each brush comprises teeth of different lengths, the maximum variation being about one-half an inch. The advantage of this construction is that in case the longer teeth become permanently bent or set from excessive flexure or other cause the shorter teeth become more exposed and the efficiency and durability of the brush thereby very materially increased.

While brush-teeth made from cable-strands give the best results under the greatest variety of conditions, other forms of brush-teeth may be preferable thereto under specific conditions. A desirable form of brush therefore is one which contains the three forms of brush-teeth, as thereby different conditions are met advantageously.

A modified form of my brake-brush consists in the use, in combination with resilient brush-teeth, of inflexible teeth $a^6$, rigidly secured in said brush-back A'. These inflexible teeth will preferably be square in cross-section and the outer ends thereof will be beveled on opposite sides, so as to form a wedge-shaped point. A desirable size for spikes of this nature is about three-quarters of an inch to one inch square and the length thereof will be a trifle less than the length of the resilient teeth $a$. It is practicable to use inflexible teeth of this kind in combination with the resilient teeth, as the principal duty will come upon such resilient teeth.

Having thus fully described my improved brake-brush, I will next describe its application and method of operation.

Figure 1:
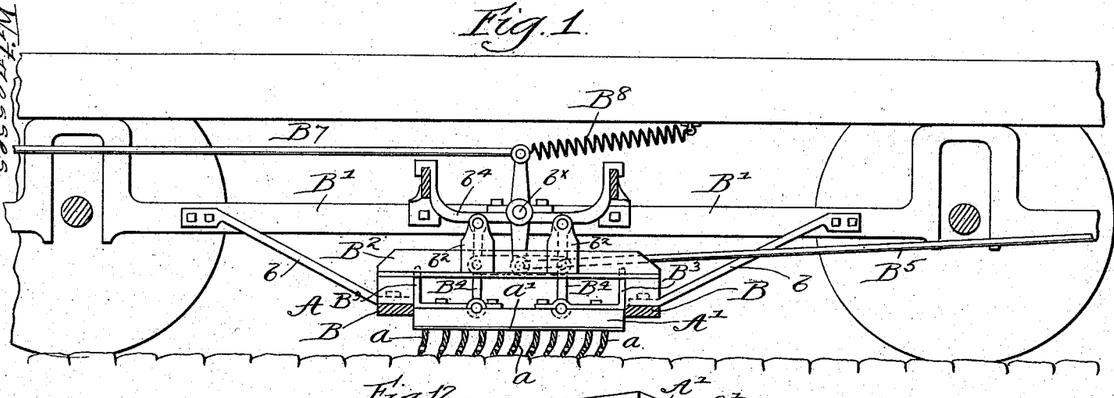
Figure 1 is a side view of a brake embodying my invention, said brake being shown as applied to the motor-car of an electric street-railway.
Figures 1R, 2, 3:
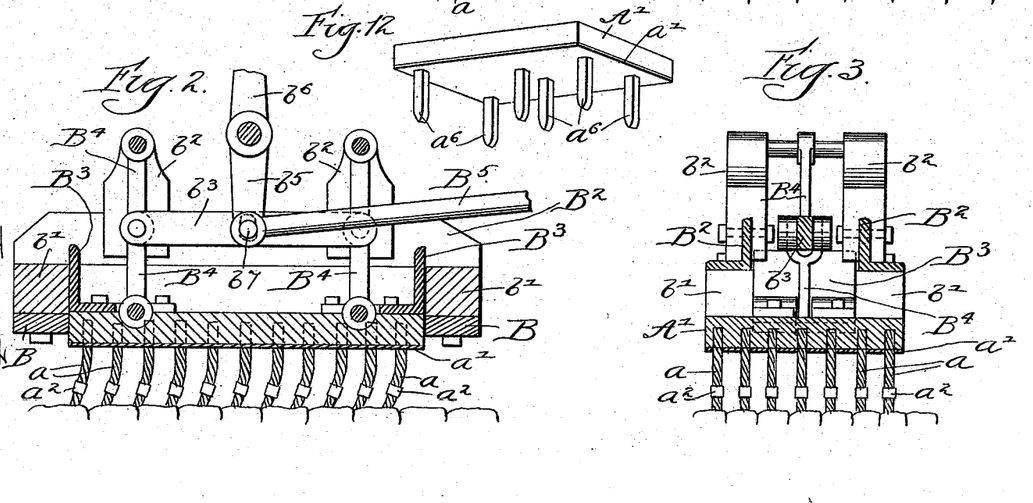
Fig. 2 is a longitudinal vertical sectional view thereof.
Fig. 3 is a transverse vertical sectional view thereof.

In Figs. 1, 2, and 3 of the drawings I have shown my improved brake as applied to the motor-car of an electric street-railway. The brake-brush A is supported beneath the middle of the car both lengthwise and crosswise, and is movable toward and from the road-bed between transverse bars B as guides, said transverse bars B being rigidly supported from the side bars B' of the car-truck frame by stay-rods $b$. Said transverse bars B also operate to maintain said brush A in permanent longitudinal adjustment relatively to said car and will take the end thrust caused by applying the brake. The brake-frame also comprises angle-bars $B^2$, rigidly secured to blocks $b'$, which are in turn rigidly secured to the upper sides of the transverse bars B. The adjacent sides of the blocks $b'$ are flush with the adjacent sides of the bars B, and thus form continuations of the guides for the brake-brush in its movement toward and from the road-bed. As shown, also, angle-plates $B^3$ are secured to the top of the brush A, the outer faces of which form upward extensions of the ends of said brake-brush and operate to distribute the thrust thereon, due to applying the brake, and also operate to prevent binding of said brush between its guides.

Movement toward and from the road-bed is imparted to said brake-brush in the following manner: Said brake-brush is pivotally connected to the lower ends of toggles $B^4$, the upper ends of which are pivoted between upright lugs or brackets $b^2$, rigidly secured to or formed integral with the longitudinally-disposed angle-bars $B^2$. The middle pivot-pins of the toggles $B^4$ are connected by a link $b^3$, to which is attached one end of a brake-rod $B^5$, which is connected to the brake-shaft secured upon the car-platform in the usual manner, whereby a strain may be brought on said toggles, tending to straighten them. Keyed to a shaft $b^\times$, mounted in suitable bearings formed on bars $b^4$, secured to the transverse truck-frame bars $B^6$, are lever-arms $b^5$ $b^6$. A slot formed in the free end of the lever-arm $b^5$ engages a pivot-pin $b^7$, secured in the link $b^3$, and the free end of the lever-arm $b^6$ is pivotally connected to one end of a brake-rod $B^7$, the opposite end of which is connected to a brake-shaft secured upon the car-platform at the opposite end of the car from that to which the brake-rod $B^5$ extends. A strain on either one of the brake-rods $B^5$ $B^7$ will obviously operate to straighten the toggles and depress the brake-brush. A coiled tension-spring $B^8$, secured at one end to the lever-arm $b^6$ and at the other to the body of the car, as shown, will operate to flex the toggles $B^4$ when the brake is released and to raise the brake-brush A out of contact with the road-bed and to maintain the same normally in raised position.

The relation and adjustment of the various parts of the brake are such that when the brake-brush A is at its extreme elevation the free ends of the brush-teeth $a$ are about two inches above the road-bed, and such also that the travel of said brush toward and from the road-bed will be about four and one-half ($4\frac{1}{2}$) inches.

Figure 4:
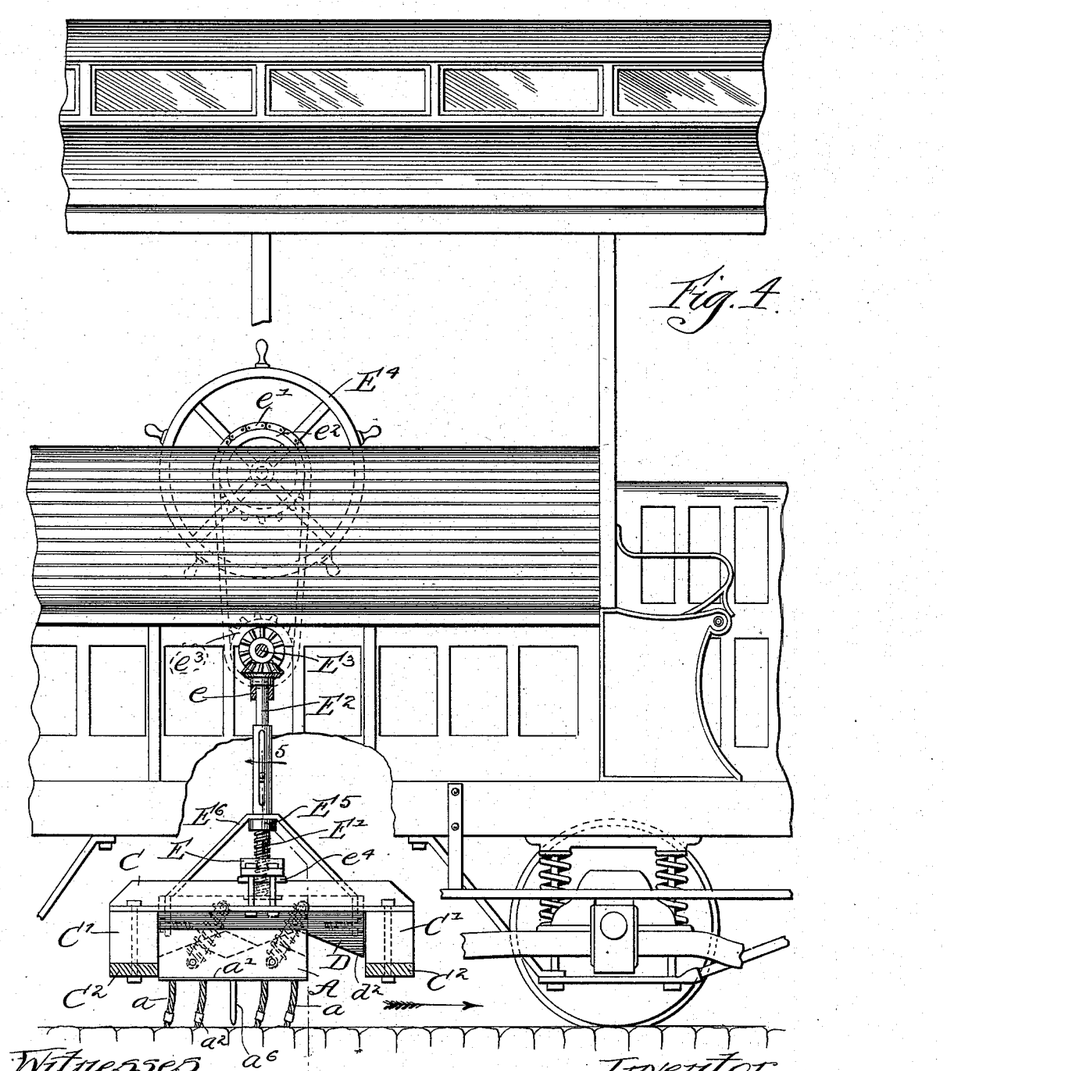
Fig. 4 is a side elevation of the automatic form of my improved brake shown as applied to the grip-car of a cable street-railway.
Figures 5, 6, 9:
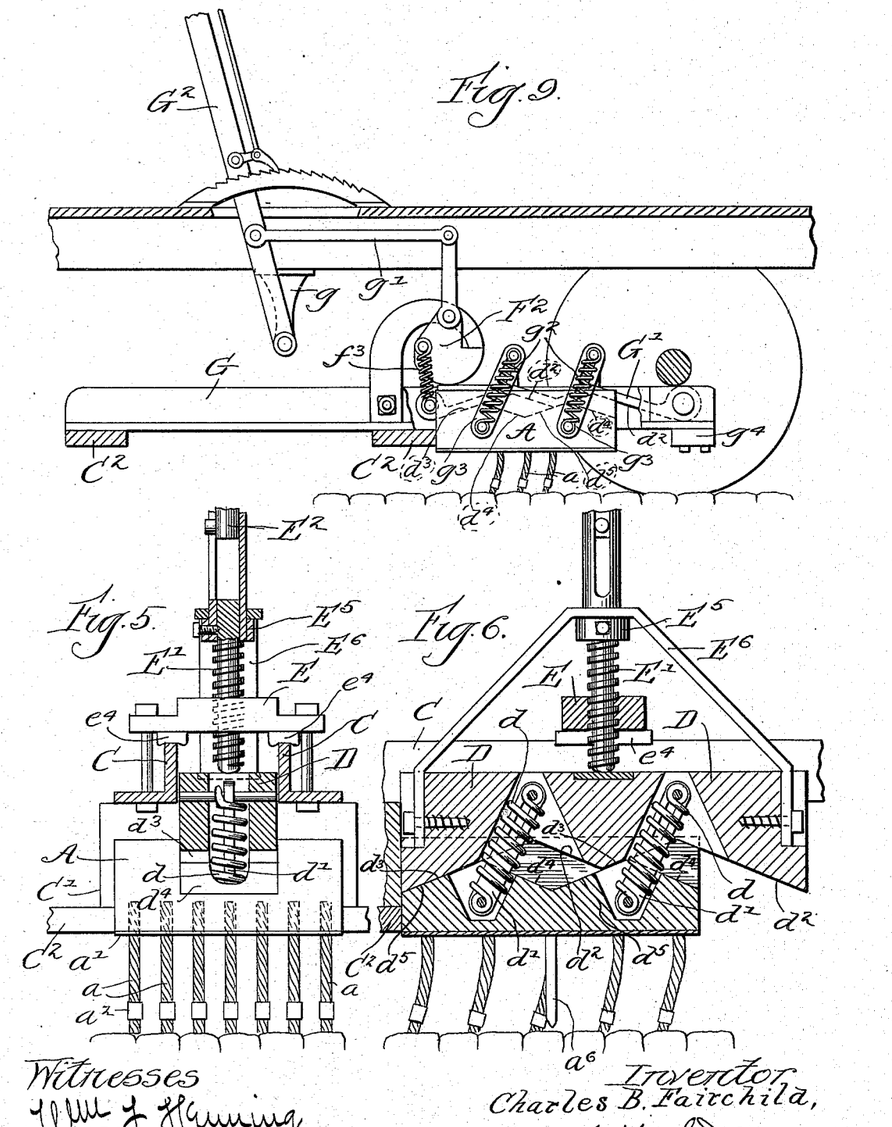
Fig. 5 is a transverse vertical section thereof on the line 5 5 of Fig. 4.
Fig. 6 is a longitudinal vertical sectional view of the automatic form of the brake shown in Fig. 4.
Fig. 9 illustrates an adaptation of the form of the brake shown in Figs. 7 and 8 to the grip-car of a cable street-railroad.

In Figs. 4, 5, and 6 of the drawings I have illustrated a modified form of my improved brake, which I designate the "automatic" form thereof, said brake being therein shown as applied to the grip-car of a cable street-railroad. As shown, said brake is supported at one side of the cable-grip so as to engage the road-bed between the slot of the cable-conduit and the rail. Owing to the narrow space in which said brush is mounted, the width of the said brush area is only about twelve (12) inches and is made correspondingly longer, say eighteen to twenty inches. In this form of the brake the brake-frame consists of longitudinally-disposed angle-bars C, firmly secured to the tops of blocks C′, which are in turn secured to the upper sides of the transverse slide-bars $C^2$ of the grip-car, thus forming a frame substantially identical in construction with that used in the form of the brake shown in Figs. 1, 2, and 3 of the drawings and heretofore described.

In the form of the brake so shown in said Figs. 4, 5, and 6 of the drawings the brake-brush A is supported in contact with the under side of a rigid block or support D by coiled tension-springs $d$, the ends of which are secured to said block or support D and said brush A, respectively. The brush A will thus be movable toward and from the road-bed relatively to said block or support D, the extent of such relative movement being limited by links $d'$, pivotally connected at one end to said brush and slots, in the other ends of which engage pivot-pins secured in said block or support D. As shown, the springs $d$ are secured to the pivot-pins of the links $d'$ and embrace said links as guides. The block or support D, carrying said brake-brush A, is bodily movable toward and from the road-bed between the slide-bars $C^2$ of the grip-car and the blocks C′ as guides, so as to depress said brake-brush A to effect contact of the free end of the brush-teeth with the road-bed or to raise them out of contact therewith. Formed on the contacting-surfaces of the block or support D and the brake-brush A are cam-surfaces, whereby movement of the brush longitudinally of said block or support will operate to advance said brush toward or retract it from the road-bed relatively to said block or support. As shown, duplicate sets of regularly-inclined surfaces $d^2$ $d^3$ are formed on said block D, corresponding oppositely-inclined surfaces $d^4$ $d^5$ being formed on the brake-brush A, the pitch of said surfaces being about one inch vertically to about three inches longitudinally.

In the preferable construction shown also the block or support D is fitted to a channel formed in the top of the brake-brush A, whereby lateral displacement of said brush relatively to said block or support is prevented, the cam-surface on the brush being formed at the bottom of said channel. In order to permit longitudinal movement of said brush A relatively to said block or support D, said brush is made considerably shorter than said block or support, the difference in length being such that, the brush being at the middle of said block lengthwise, it may move in either direction sufficiently to depress the brush about two inches. With inclined surfaces of a pitch of one inch in three said brush will be from twelve to fourteen inches shorter than said block, and the respective lengths of said inclined surfaces are preferably from two to three inches more than the maximum travel of said brush longitudinally of said block or support when in its middle position. It therefore results from the use of duplicate sets of inclined surfaces that said brush will always be supported at both ends when moving in either direction.

It is obvious that the springs $d$ will operate to maintain said brush A normally at the middle of the block or support D, thus providing for movement in either direction, and will also operate to maintain said brush at the limit of its retraction relatively to said block or support.

When the block or support D, carrying the brush A, is depressed sufficiently to bring the free ends of the brush-teeth $a$ into contact with the road-bed, the resistance offered to the passage of said brush over said road-bed will operate automatically to impart a longitudinal movement to said brush relatively to said block or support, whereby said brake-brush will be further depressed, so as to engage the road-bed with desired force.

Movement of the brake-brush A longitudinally of the block or support D is limited by means of suitable rigid stops, which also operate to take the end thrust due to the application of the brake. As shown, these stops are formed by the slide-bars $C^2$ of the truck-frame of the car, which extend below the block or support D at all times and into the path of the said brush A.

The means for lowering and raising the block or support D to bring the free ends of the brush-teeth into contact with the road-bed, or to raise them out of contact therewith, are as follows: Threaded through a nut E, rigidly secured to the frame-bars C, is a screw E', the end of which bears upon the top of the block or support D at the middle thereof. The upper end of the screw E' is tubular, and fitted to and splined therein is a shaft $E^2$, the upper end of which is supported in a suitable bearing formed in a bracket $e$, secured to the body of the car. A beveled gear secured to the shaft $E^2$ meshes with a beveled gear secured to a horizontal shaft $E^3$, mounted in suitable stationary bearings on the body of the car. Pivotally supported upon the body of the car, in position to be accessible to the gripman, is a hand-wheel $E^4$, rotation of which is imparted to the shaft $E^3$ by means of a chain belt $e'$, adjusted to sprocket-wheels $e^2$ $e^3$, rigidly secured to the hub of said hand-wheel and to said shaft $E^3$, respectively.

Rigidly secured to the screw E' above the nut E is a collar $E^5$, which, as the screw is raised, is adapted to come into contact with a bar or rod $E^6$, which embraces said screw above said collar and is connected to both ends of the block or support D. In order to allow the brake-brush A to adjust itself to inclined road-beds, the bar or rod $E^6$, in the preferable construction shown, is pivotally connected to said block or support D.

In order to prevent binding of the screw E' in the nut E, rubber cushions $e^4$ are placed under the ends of said nut E and between it and the frame-bars C.

The operation of this form of my improved brake is as follows: The block or support D and the brush A being fully retracted and it being desired to apply the brake, the gripman turns the hand-wheel to lower the screw and thus depress the block or support D and the brake-brush A carried thereon until the free ends of the brush-teeth $a$ come into contact with the road-bed. The resistance offered to the passage of said brake-brush over the road-bed will operate, automatically, to impart longitudinal movement to said brush relatively to said block or support D, whereby the said brush will be depressed into forcible engagement with the road-bed and the car stopped. When it is desired to release the brake, the hand-wheel is turned in the opposite direction, whereby the screw E' will be raised, and the collar $E^5$, coming into contact with the rod or bar $E^6$, will operate to raise said block or support D and with it the brush A until the free end of the brush-teeth $a$ are clear of the pavement. The springs $d$ then operate to further retract said brake-brush and to return it to its normal position at the middle of the block or support D.

Figure 7:
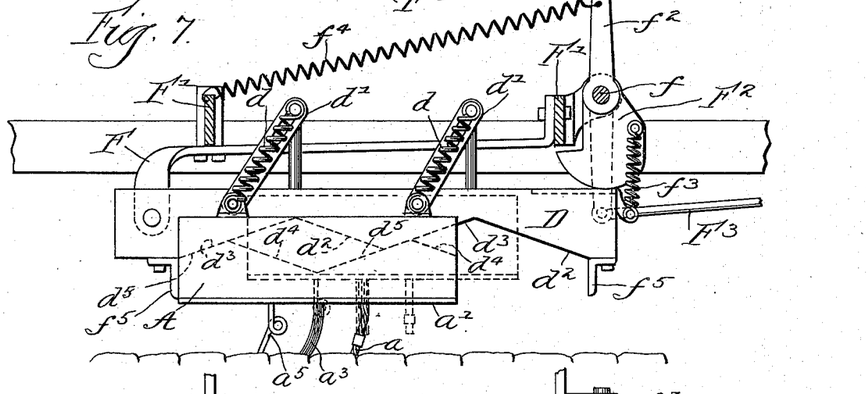
Fig. 7 is a side elevation of a modification of the automatic form of my improved brake.

In Figs. 7 and 8 of the drawings I have shown a modification of the automatic form of my improved brake, said brake being shown as applied to the motor-car of an electric street-railway. In its essential features the modified form of my improved brake (illustrated in Figs. 7 and 8 of the drawings) are substantially identical with those of the form of brake illustrated in Figs. 4, 5, and 6 of the drawings and heretofore described, comprising the block or support D, to which the brake-brush A is connected by the springs $d$ and the links $d'$, and provided with the inclined surfaces $d^2$ $d^3$ and $d^4$ $d^5$, respectively, whereby movement of the brush A longitudinally of said block or support D will operate to depress the same relatively thereto. The modification consists in the method of supporting the block or support D and in the method of depressing the same, so as to bring the free ends of the brush-teeth $a$ into contact with the road-bed, which I will now describe. The block or support D is pivotally connected at one end to a rod or bar F, rigidly secured to the transverse frame-bars F' of the truck-frame, as clearly shown. Keyed to a shaft $f$, mounted in suitable brackets $f'$, secured to one of the frame-bars F' of the truck-frame, above the free end of said block or support D, is a cam-block $F^2$, the cam-surface of which bears upon the top of said block or support D and will depress the end thereof when said lever is rotated in the proper direction. Rigidly secured to the shaft $f$ are lever-arms $f^2$, connected by brake-rods $F^3$ to brake-shafts (not shown) mounted on the car-platforms at opposite ends of the car. Obviously a strain on either of said brake-rods $F^3$ will operate to rotate the cam-block $F^2$ in direction to depress the free end of the block or support D. The free end of said block or support D is also connected by a link $f^3$ with said cam-block $F^2$, whereby, when said cam-block is rotated in a direction to relieve the pressure on said block or support, said block or support will be raised. In the preferable construction shown the link $f^3$ is a spring-link, as the fine proportions of parts which would be necessary in case a rigid link were used are thereby avoided. A coiled tension-spring $f^4$, applied to the end of one of the lever-arms $f^2$, as shown, operates to rotate the cam-block $F^2$ in proper direction to relieve the pressure on the block or support D when the brake is released, and through the medium of the link $f^3$ to raise the free end of said block or support D and to maintain it normally raised and inoperative. Longitudinal movement of the brush A relatively to the block or support D is limited by stops $f^5$, consisting of angle-plates rigidly secured to said block or support D, which likewise operate to take the end thrust due to the application of the brake.

The operation of a brake of this form is obvious and need not be described in detail.

Figure 10:
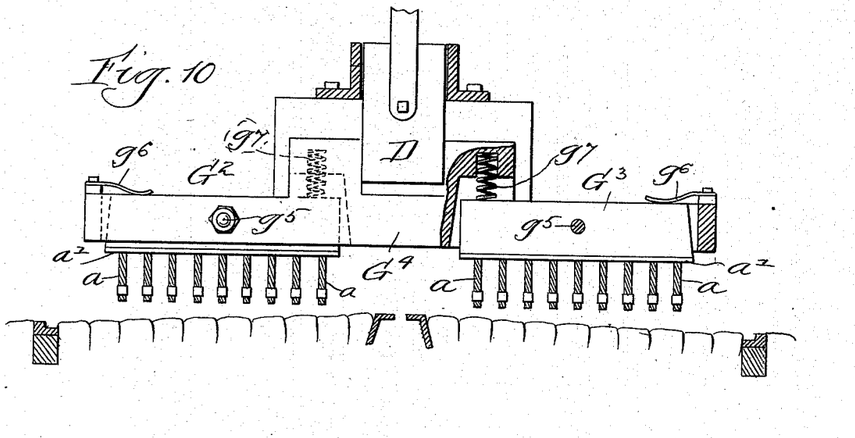
Figs. 10 and 11 illustrate a form of brake the brush of which will accommodate itself to an inclined road-bed.
Figure 11:
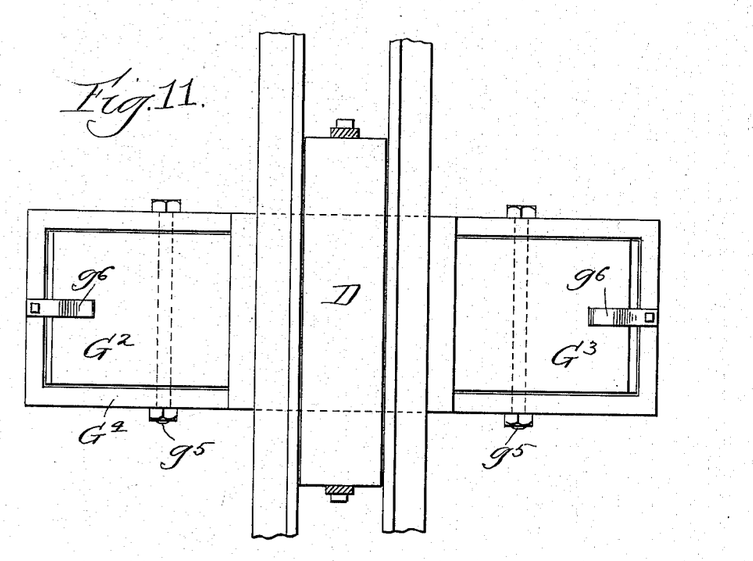

In Figs. 9, 10, and 11 of the drawings I have shown an adaptation of my improved brake to the grip-car of a cable-railway, whereby it is rendered possible to use the preferred form and size of brake-brush, comprising brush-surfaces aggregating about thirty inches in width and about eight inches in length, which will engage the road-bed symmetrically on both sides of the slot of the cable-conduit. As shown, the brake is mounted upon the car directly in front of the grip and is supported upon a suitable frame consisting of longitudinally-disposed angle-bars G, which are rigidly secured directly to the tops of the slide-bars $C^2$ of the grip-car, the forward ends of which are extended and take under the front axle of the car, which thus sustains the thrust due to the application of the brake. Owing to the limited space available in which to mount the brake, iron cam-bars G' are substituted for the block or support D, said bars being pivoted at one end to the frame-bars G, and a pivoted cam-lever $F^2$ being applied to the free ends thereof to depress the same, and said cam lever and bars being connected by a spring-link $f^3$, whereby said bars will be raised when said brake is released, all as heretofore described in connection with the description of the form of the brake illustrated in said figures. As applied to a grip-car, the cam-lever $F^2$ is preferably controlled by means of a lever $G^2$, pivoted at its lower end to a bracket $g$, depending from the body of the car, said lever being so located as to be accessible to the gripman. Said lever $G^2$ is connected above its pivotal point with the free end of the cam-lever $F^2$ by a rigid link $g'$. The brake-brush A is supported in contact with and is connected to the bars G' by tension-springs $g^2$ and links $g^3$, and said bars G' and brush A are provided with duplicate cam-surfaces $d^2$ $d^3$ and $d^4$ $d^5$, respectively, as in the other automatic forms of the brake. Said springs will thus operate to maintain said brush normally retracted and at the middle of its longitudinal travel relatively to said cam-bars G', while said links $g^3$ will operate to limit the relative movement of said bars and brush all in the usual manner. The stops to limit the longitudinal travel of said brush, relatively to said pivoted cam-bars G', are formed by the forward slide-bar $C^2$ of the grip-car and by a block $g^4$, secured to the forward ends of the frame-bars G at the under side thereof. When the road-bed is level, a solid brake-brush, such as heretofore described, may be used. When, however, the road-bed declines from the slot of the cable-conduit to the rails, it is desirable to use a form of brush that will accommodate itself to said road-bed and thus create a uniform pressure on said brush. The form of brush shown in connection with this form of the brake is adapted to effect this end. As shown, said brake-brush consists of two separate brush-sections $G^2$ $G^3$, pivotally supported in the middle by rods or pins $g^5$ in a suitable frame $G^4$, in which are formed suitable holes or openings for the reception of said brush-sections $G^2$ $G^3$. In this form of the brush the cam-surfaces $d^4$ $d^5$, and other agencies controlling the automatic operation of said brake, are formed on and applied to the frame $G^4$, which in this respect correspond to the brush-back A' in the other automatic forms of the brake. The brush-sections $G^2$ $G^3$ are maintained normally in a horizontal position by means of leaf-springs $g^6$, applied to the outer sides thereof, and coiled springs $g^7$, applied to the inner sides thereof.

The operation of this form of brake is obvious.

A great advantage which my brake possesses is that when depressed into strong contact with the road-bed not only is a frictional resistance created, but the resilient teeth will engage all slight depressions and elevations in the track and will thus cause a further resistance to the movement of said brush along said road-bed, which in the case of an ordinary granite or cobblestone pavement will greatly exceed the frictional resistance, the two resistances combined operating to stop the car very quickly.

While I consider a brake-brush having resilient teeth as embodying my invention in its preferable form, I do not wish to limit myself thereto, as my invention also contemplates the use of a brush with rigid inflexible teeth only. In Fig. 12 of the drawings a brush of this kind is shown. In this form of the brush comparatively few teeth are used, and they are distributed over a considerable surface. In its other features a brake, the brush of which has inflexible teeth, may conform to any of the other forms of the device herein shown.

The specific forms of the brake shown in Figs. 4, 5, and 6 and in Figs. 7 and 8 of the drawings, respectively, are made the subjects of separate applications for United States Letters Patent by me, both filed in the United States Patent Office on the 18th day of February, 1896, and bearing Serial Nos. 579,717 and 579,718, respectively, and for this reason said specific forms of my improved brake are not claimed herein.

I claim—

1. In a vehicle-brake, the combination with a brake-brush, consisting of a rigid back, in which are secured a plurality of resilient brush-teeth, said brake-brush being movable toward and from the road-bed, stops, whereby said brake-brush will be maintained in longitudinal adjustment upon said car and means to depress said brake-brush to bring the free ends of the brush-teeth into contact with the road-bed, substantially as described.

2. In a vehicle-brake, the combination of a brake-brush, consisting of a rigid back in which are secured a plurality of resilient brush-teeth, said brake-brush being movable toward and from the road-bed in suitable rigid guides, which will operate to maintain said brake-brush in fixed longitudinal adjustment, relatively to said car and means to depress said brake-brush to bring the free ends of said brush-teeth into contact with the road-bed, substantially as described.

3. In a vehicle-brake, the combination with a brake-brush, consisting of a rigid back in which are secured a plurality of resilient brush-teeth, said brake-brush being movable toward and from the road-bed in suitable guides, which also operate to impart movement of the car along its road-bed to said brush, toggles connected to said brake-brush and a lever or levers applied to said toggles to straighten and flex the same, the construction and relation of the parts being such that straightening the toggles will depress the brake-brush and bring the free ends of the brush-teeth into contact with the road-bed and flexure of the toggles will raise the brush and retract the free ends of said brush-teeth from said road-bed, substantially as described.

4. In a vehicle-brake, the combination of transverse frame-pieces rigidly secured to the car-truck, longitudinal frame-pieces secured to said transverse frame-pieces, a brake-brush, consisting of a rigid back in which are secured a plurality of resilient brush-teeth, said brush being movable toward and from the road-bed between said transverse frame-pieces as guides, upright lugs or brackets secured to or formed integral with said longitudinal frame-pieces, toggles, pivoted at one end between the upper ends of said lugs or brackets and at the other to said brake-brush, and a lever applied to said toggles to straighten and flex the same, the relation and adjustment of the parts being such that straightening said toggles will depress said brake-brush and bring the free ends of the brush-teeth into contact with the road-bed and flexure of said toggles will raise the brush and retract the free ends of said brush-teeth from said road-bed, substantially as described.

5. A brake-brush for a car-brake of the type described, consisting of a rigid back in which are secured a plurality of resilient brush-teeth, substantially as described.

6. A brake-brush for a brake of the type described, consisting of a rigid back in which are secured a plurality of resilient brush-teeth, said teeth being made from strands of cable drawn to a mild spring-temper, substantially as described.

7. In a vehicle-brake, the combination of a brake-brush, consisting of a rigid back in which are secured a plurality of teeth, said brake-brush being movable toward and from the road-bed, stops, whereby said brake-brush is maintained in permanent longitudinal adjustment upon said vehicle, and means to lower and raise said brake-brush to bring the free ends of the brush-teeth into and out of contact with the road-bed, substantially as described.

In testimony that I claim the foregoing as my invention I have hereunto set my hand this 22d day of November, 1895.

CHARLES B. FAIRCHILD.

Witnesses:
NATHANIEL S. ROBINSON,
GRACE FERN.